US009095821B1

(12) United States Patent
Ratto et al.

(10) Patent No.: US 9,095,821 B1
(45) Date of Patent: *Aug. 4, 2015

(54) NON-REACTIVE PROCESS FOR FIXING NANOTUBES IN A MEMBRANE IN THROUGH-PASSAGE ORIENTATION

(75) Inventors: Timothy V. Ratto, Oakland, CA (US); Jason K. Hott, Berkeley, CA (US); Alan Szmodis, Oakland, CA (US); Alyssa-Jennifer Avestro, Evanston, IL (US); Michael O'Connell, San Jose, CA (US)

(73) Assignee: NAGARE MEMBRANES, LLC, Coventry, CT (US)

( * ) Notice: Subject to any disclaimer, the term of this patent is extended or adjusted under 35 U.S.C. 154(b) by 780 days.

This patent is subject to a terminal disclaimer.

(21) Appl. No.: 13/206,038

(22) Filed: Aug. 9, 2011

Related U.S. Application Data

(60) Provisional application No. 61/397,726, filed on Oct. 26, 2010.

(51) Int. Cl.
| | |
|---|---|
| *B01D 39/00* | (2006.01) |
| *B01D 71/06* | (2006.01) |
| *B29C 45/00* | (2006.01) |
| *B01D 69/12* | (2006.01) |
| *B01D 69/14* | (2006.01) |
| *B01D 71/56* | (2006.01) |
| *B01D 71/68* | (2006.01) |
| *B01D 71/48* | (2006.01) |

(52) U.S. Cl.
CPC ............. *B01D 69/12* (2013.01); *B01D 69/148* (2013.01); *B01D 71/56* (2013.01); *B01D 71/68* (2013.01); *B01D 71/48* (2013.01); *B01D 2323/22* (2013.01)

(58) Field of Classification Search
CPC ...... B01D 69/148; B01D 69/12; B01D 71/26; B01D 67/0009; B01D 2325/022; B01D 2325/023; B01D 71/08; B82Y 30/00; B29C 67/20; B29C 67/202; B29C 39/003
USPC .................. 210/500.27, 500.38, 500.41, 490, 210/502.1; 427/244; 264/41, 45.5
See application file for complete search history.

(56) References Cited

U.S. PATENT DOCUMENTS

| | | | | |
|---|---|---|---|---|
| 4,228,994 | A * | 10/1980 | Volpe | 271/250 |
| 4,240,914 | A * | 12/1980 | Iwama et al. | 210/500.39 |
| 4,629,563 | A | 12/1986 | Wrasidlo | |
| 4,824,568 | A | 4/1989 | Allegrezza, Jr. et al. | |
| 5,273,657 | A | 12/1993 | Nakashima et al. | |
| 5,824,689 | A | 10/1998 | Lee et al. | |
| 6,056,903 | A * | 5/2000 | Greenwood et al. | 264/41 |
| 6,162,358 | A | 12/2000 | Li et al. | |
| 6,183,640 | B1 | 2/2001 | Wang | |
| 6,426,134 | B1 | 7/2002 | Lavin et al. | |
| 6,858,197 | B1 | 2/2005 | Delzeit | |
| 6,863,942 | B2 | 3/2005 | Ren et al. | |
| 7,148,269 | B2 | 12/2006 | Winey et al. | |
| 7,205,069 | B2 | 4/2007 | Smalley et al. | |
| 7,211,320 | B1 | 5/2007 | Cooper et al. | |
| 7,375,359 | B1 * | 5/2008 | Grodzins | 250/515.1 |
| 7,459,121 | B2 | 12/2008 | Liang et al. | |
| 7,544,626 | B2 | 6/2009 | Tang et al. | |
| 7,585,412 | B2 | 9/2009 | Gorsuch et al. | |
| 7,611,628 | B1 | 11/2009 | Hinds, III | |
| 7,623,340 | B1 | 11/2009 | Song et al. | |
| 7,993,524 | B2 | 8/2011 | Ratto et al. | |
| 8,038,887 | B2 | 10/2011 | Bakajin et al. | |
| 8,177,979 | B2 * | 5/2012 | Ratto et al. | 210/652 |
| 8,196,756 | B2 * | 6/2012 | Ratto et al. | 210/500.41 |
| 8,286,803 | B2 * | 10/2012 | Nowak et al. | 210/490 |
| 8,567,612 | B2 * | 10/2013 | Kurth et al. | 210/500.38 |
| 8,591,741 | B2 * | 11/2013 | Wang et al. | 210/652 |
| 8,940,173 | B2 * | 1/2015 | Bakajin et al. | 210/645 |
| 2003/0180526 | A1 | 9/2003 | Winey et al. | |
| 2004/0173506 | A1 | 9/2004 | Doktycz et al. | |
| 2005/0183405 | A1 | 8/2005 | Gillingham et al. | |
| 2008/0223795 | A1 | 9/2008 | Bakajin et al. | |
| 2008/0290020 | A1 | 11/2008 | Marand et al. | |
| 2009/0118420 | A1 | 5/2009 | Zou et al. | |
| 2009/0321355 | A1 * | 12/2009 | Ratto et al. | 210/651 |
| 2010/0143701 | A1 * | 6/2010 | Zhu et al. | 428/323 |
| 2010/0152326 | A1 * | 6/2010 | Kurz | 523/339 |
| 2010/0206811 | A1 * | 8/2010 | Ng et al. | 210/654 |
| 2011/0111177 | A1 * | 5/2011 | Hata et al. | 428/161 |
| 2011/0186506 | A1 | 8/2011 | Ratto et al. | |
| 2011/0220574 | A1 * | 9/2011 | Bakajin et al. | 210/650 |
| 2011/0290730 | A1 | 12/2011 | Ratto et al. | |
| 2012/0085697 | A1 * | 4/2012 | Tang | 210/497.1 |

OTHER PUBLICATIONS

LANX Fabric Systeme™, Chemical and Biological Protective Apparel, www.lanxfabrics/lanxUndergarments.htm, Feb. 20, 2012, 1pg.
U.S. Appl. No. 13/458,376, filed Apr. 27, 2012, Specification, 14pgs.

* cited by examiner

*Primary Examiner* — Ana Fortuna
(74) *Attorney, Agent, or Firm* — The Marbury Law Group PLLC

(57) ABSTRACT

A polymer membrane is formed around nanotubes by applying either droplets or a thin film of a suspension of the nanotubes over a layer of a solution of the polymer, the suspending medium for the nanotubes and the solvent(s) for the polymer selected such that the suspending agent will evaporate while it is migrating into and dispersing in the solvent. When the polymer is then permitted to coagulate around the nanotubes, the coagulated polymer will fix the orientations of the nanotubes and a high proportion of the nanotubes will protrude from both sides of the resulting membrane to provide through-passages through the membrane.

45 Claims, No Drawings

NON-REACTIVE PROCESS FOR FIXING NANOTUBES IN A MEMBRANE IN THROUGH-PASSAGE ORIENTATION

BACKGROUND OF THE INVENTION

1. Field of the Invention

This invention resides in the field of nanoparticle arrays, including nanotubes supported in thin membranes or sheets of polymeric material.

2. Description of the Prior Art

Nanotubes offer a wide range of applications that take advantage of their unique electrical, mechanical, and chemical properties. Arrays of nanoparticles, and specifically nanotubes, have been used in biomedical scaffolds, thermally and electrically conductive films, field emission devices, gas storage media, and nanofiltration membranes, including reverse osmosis membranes and ultrafiltration membranes. In many of these devices, the orientations of the nanoparticles in the array affect the device performance. Nanotubes can help disperse heat or electrical charges, for example, when the nanotubes are randomly oriented, and in some cases oriented in random directions within a plane. Conversely, nanotubes can promote the passage of molecules or energy in a given direction, such as across a plane, surface, layer, or film, when aligned in that direction. This effect is useful for example in nanofiltration membranes and reverse osmosis membranes, when most or all of the nanotubes traverse and extend fully through the membrane to serve as conduits for passage from one side of the membrane to the other. Water desalination membranes are examples of such membranes. The effectiveness of the inclusion of carbon nanotubes in these membranes arises from the fact that water molecules pass through nanotube channels at a significantly faster rate than salt ions or other species whose molecular size exceeds that of water. In some instances, the salt ions can be completely excluded from the nanotube channels. Nanotube-based water desalination media have been formed on silicon chips, as disclosed by Bakajin, O., et al. (Regents of the University of California), International (PCT) Patent Application Publication No. WO 2007/025104 A2, publication date Mar. 1, 2007, and by Holt, J. K., et al., "Fast Mass Transport Through Sub-2-Nanometer Carbon Nanotubes," Science 312, 1034-1037 (19 May 2006). The fabrication process produces a dense, vertically-aligned array of double-wall carbon nanotubes (DWCNTs) on the surface of the chip by chemical vapor deposition (CVD), followed by the deposition of silicon nitride, also by CVD, to fill the gaps between the DWCNTs. Various other nanotube-containing structures designed for other uses also rely on transversely oriented nanotubes.

SUMMARY OF THE INVENTION

It has now been discovered that a membrane-supported nanotube array in which at least a large proportion of the nanotubes extend through, and protrude from both sides of, the membrane can be prepared by a process in which a liquid suspension of nanotubes is placed in contact with a liquid film or layer of a liquid solution of a polymer, under conditions that allow the liquid suspending medium to evaporate, preferably concurrently, with the dissolving of the suspending medium in the polymer solution, followed by solidification of the polymer to form a skin or continuous supporting membrane around the nanotubes. The liquid suspending medium and the solvent in the polymer solution are thus mutually miscible and yet initially separated into different liquid phases, one containing the dissolved polymer and the other containing suspended nanotubes. A feature of the discovery is that when the suspending medium evaporates at the same time that the two liquid media mutually dissolve, the nanotubes tend to orient themselves in a direction transverse to the contacting surfaces of the two liquid media, and that this orientation can then be fixed by coagulation of the polymer. In stating herein that a "large proportion" of the nanotubes pass through and protrude from both sides of the polymer film, it is meant that the proportion of nanotubes that traverse the membrane in this manner is significantly greater than the proportion that would pass through if solidification of the polymer were permitted to occur without the layering and relative directional migration of the two liquid media, combined with the evaporation, such as the simultaneous evaporation. The nanotubes have a preferred orientation relative to the skin but are not aligned with respect to each other, as will be explained in more detail below. Accordingly, in applications where the resulting membrane is used for nanofiltration, for example, the filtrate throughput rate is measurably higher and more economically viable than that achieved with membranes containing nanotubes that are fully random in orientation. The term "membrane" is used herein to denote any thin layer of solidified continuous polymer, which may be planar or non-planar, flexible or non-flexible, and free-standing or affixed to a support layer such as a porous or non-porous substrate.

Control of the rates of evaporation of the suspending medium and of the migration and mutual dissolving of the two liquids to achieve the effect obtained by the present invention can be achieved in a variety of ways. In certain embodiments, the effect is achieved by performing the process in an environment of controlled temperature and pressure, particularly a controlled partial pressure of the evaporating suspending medium. In other embodiments, a mixture of two mutually miscible organic liquids is used as the suspending medium, one of the liquids being more volatile than the other. The evaporation and migration rates of these two-liquid suspending media can be controlled by selection of the two liquids, of the difference between their boiling points, and of the relative amounts of the two liquids, or all of these parameters. In still other embodiments, two mutually miscible organic liquids can also be used but applied separately, with the nanotubes suspended in one or both of the liquids. Control can also be achieved by the means by which the liquid media are placed in contact. Thus, the suspension can be applied to the liquid polymer solution layer either as a thin film or as droplets, or as a pre-formed, relatively static liquid layer by a blotting procedure from a wetted surface.

These and other objects, advantages, and features of the invention and of its various embodiments are more fully explained in the sections that follow.

DETAILED DESCRIPTION OF THE INVENTION AND PREFERRED EMBODIMENTS

Nanotubes are cylindrical tubular structures of nanoscale diameters whose walls consist of lattices of atoms linked by covalent bonds. Nanotubes of a variety of materials, including carbon, boron, and boron nitride, are well known in the art and commercially available. Those that have been most extensively studied are carbon nanotubes, and the features of carbon nanotubes and their methods of fabrication are illustrative of nanotubes in general.

Carbon nanotubes are polymers of pure carbon, and exist as both single-wall and multi-wall structures. Examples of publications describing carbon nanotubes and their methods of fabrication are Dresselhaus, M. S., et al., *Science of Fullerenes and Carbon Nanotubes*, Academic Press, San Diego (1996), Ajayan, P. M., et al., "Nanometer-Size Tubes of Carbon," *Rep. Prog. Phys.* 60 (1997): 1025-1062, and Peigney, A., et al., "Carbon nanotubes in novel ceramic matrix nanocomposites," *Ceram. Inter.* 26 (2000) 677-683. A single-wall carbon nanotube is a single graphene sheet rolled into a seamless cylinder with either open or closed ends. The average diameter of a single-wall carbon nanotube typically ranges from 0.6 nm to 2.0 nm, and in many cases 1.5 nm to 10 nm. The aspect ratio, i.e., length to diameter, typically ranges from about 25 to about 1,000,000, and most often from about 100 to about 1,000. A nanotube of 1 nm diameter may thus have a length of from about 100 nm to about 1,000 nm. Multi-walled carbon nanotubes are two or more concentric cylinders of graphene sheets forming a layered composite tube with a distance of approximately 0.34 nm between adjacent layers and may range in size from 2.0 nm to 100 nm.

Carbon nanotubes can be prepared by a variety of methods, prominent among which are arc discharge, laser ablation, and chemical vapor deposition, all known in the art and documented in the literature. The arc discharge process results in a mixture of single-wall and multi-wall nanotubes, although the formation of single-wall nanotubes can be favored by the use of transition metal catalysts such as iron or cobalt. Descriptions of the process are found in Iijima, S., "Helical Microtubules of Graphitic Carbon," *Nature* 354: 56 (1991), and Ebbesen, T. W., et al., "Large-Scale Synthesis of Carbon Nanotubes," *Nature* 358: 220 (1992). Laser ablation produces single-wall nanotubes, and descriptions appear in Thess, A., et al., "Crystalline Ropes of Metallic Carbon Nanotubes," *Science* 273 (1996): 483-487, and Witanachi, S., et al., "Role of Temporal Delay in Dual-Laser Ablated Plumes," *J. Vac. Sci. Technol. A* 3 (1995): 1171-1174. Chemical vapor deposition is exemplified by the high-pressure carbon monoxide conversion ("HiPC®") process disclosed by Nikolaev, P., et al., "Gas-phase catalytic growth of single-walled carbon nanotubes from carbon monoxide," Chem. Phys. Lett. 313, 91-97 (1999), and by Bronikowski, M. J., et al., "Gas-phase production of carbon single-walled nanotubes from carbon monoxide via the HiPco process: A parametric study," *J. Vac. Sci. Technol.* 19, 1800-1805 (2001).

Certain procedures for the synthesis of nanotubes will produce nanotubes with open ends while others will produce closed-end nanotubes. Nanotubes that are synthesized in closed-end form can have their ends opened by a variety of methods known in the art, including mechanical cutting as well as chemical and thermal means. Chemical means include the use of carbon nanotube degrading agents, such as a mixture of a nitric acid and sulfuric acid in aqueous solution at concentrations of up to 70% and 96%, respectively, and reactive ion etching. Thermal means include exposure to elevated temperature in an oxidizing atmosphere, notably oxygen at a concentration ranging from 20% to 100% by volume, at a temperature of 200° C. to 450° C. A nanotube synthesis procedure that produces open-ended nanotubes is described by Hua, D. H. (Kansas State University Research Foundation), International (PCT) Patent Application Publication No. WO 2008/048227 A2, publication date Apr. 24, 2008. Thus, the nanotubes may be grown or treated such that both ends are open and then the open ended nanotubes are provided into a suspension, such that the nanotube suspension (which will be described in more detail below) already contains nanotubes which are open ended on both ends. Alternatively, the nanotube suspension contains nanotubes which are close ended on one or both ends. In this case, one or both of the closed ends of the nanotubes protruding through the polymer skin are opened after the polymer skin is solidified, as will be described in more detail below. The nanotube degrading agents and/or the high temperature oxidizing anneal may be used to open the closed nanotube ends which protrude from one or both major surfaces of the polymer skin.

The lengths of nanotubes can vary widely and nanotubes of a wide range of lengths can be used in the practice of the present invention. The lengths are expressed herein as average lengths, using numerical or arithmetic averages. In most applications, the average length of a single nanotube is from about 100 nm to about 2000 nm, most often from about 500 nm to about 1500 nm, whether the nanotubes are single-wall nanotubes, multi-wall nanotubes, or a combination of single-wall and multi-wall nanotubes. In many cases as well, the ratio of the average length of the nanotubes to the thickness of the coagulated polymer skin or membrane that is ultimately form is from about 1.3 to about 5. The outer and inner diameters of the nanotubes can likewise vary. In many embodiments of the invention, the outer diameters range from about 0.6 nm to about 200 nm, while narrower ranges are often preferred for particular applications. The inner diameters in the most common embodiments can likewise range from about 0.4 nm to about 200 nm, although the optimal diameters for particular applications may be within narrower ranges. For reverse osmosis, and notably for water desalination, a preferred inner diameter range is about 0.4 nm to about 5 nm, and a most preferred range is from about 0.4 nm to about 1.2 nm. For nanofiltration membranes, a preferred size range is from about 1 nm to about 10 nm. For ultrafiltration membranes, a preferred size range is from about 5 nm to about 200 nm.

The polymer that serves to fix the nanotubes in a layer or mass in their desired orientations can vary widely. Examples are polyurethanes, polyphthalamides, polyesters, polysulfonamides, polyamides, and polyimides. Cellulose acetate and polyimide are particularly useful in many applications. A further characteristic of polymers that are useful in the practice of this invention is their solubility in a solvent, most often a nonaqueous solvent, and their ability to coagulate upon a solvent exchange or exposure to a coagulating agent. Fully formed polymers, i.e., those requiring no further chemical conversions or reactions to form a continuous solid mass, can be used, and coagulation can be achieved by conventional means, including for example the exchange of a nonaqueous solvent in which the polymer is initially dissolved with water. The solvent in which the polymer is dissolved will be one that not only dissolves the polymer, but one that wets the substrate on which the liquid layer is formed, and one from which the polymer can be coagulated in the final stage of the procedure. When a porous support is used, the expression that the solvent "wets" the support in the context of this invention denotes that the pores of the support contain a sufficient quantity of the solution that the coagulated polymer layer that is ultimately formed is substantially, if not entirely, at the outer (flat) surface of the support. Such wetting can be achieved by saturating the microporous support with the polymer solution, including immersing the support in the solution long enough to allow the escape of all gas bubbles. In some cases, saturation times can range from 1 minute to 60 minutes, preferably from 1 minute to 30 minutes, and most preferably from 1 minute to 10 minutes. In other cases, saturation times can range from 1 hour to ten hours, preferably from 2 hours to five hours. Alternately, the polymer solution can be cast down onto the support using carious casting methods, such as blade, slot, or gravure, all well known in the art.

Examples of nonaqueous solvents for the polymer are ketones, amides, alcohols, and glycols, and mixtures of these different types. Acetone and formamide are one example of such a mixture. In mixtures such as these, the relative amounts of the two solvents can vary and will be selected on the basis of the ability of the combination to dissolve the polymer at the desired concentration as well as the ease with which the polymer can be coagulated from the combined solvents, or from the remaining solvent when one of the solvents has evaporated concurrently with the evaporation of the nanotube suspending medium. With a mixture of acetone and formamide, for example, the proportion of acetone to formamide (on a weight basis) will often provide optimal results when ranging from about 1:1 to about 10:1, or from about 2:1 to about 5:1. The relative amounts of other mixtures for optimal performance are readily determinable by routine experimentation.

The concentration of the polymer in the solvent can vary, but will be selected on the basis of the polymer solubility and its ability to coagulate readily under the chosen coagulation conditions. In most cases, best results will be obtained with concentrations within the range of about 5% to about 50% by weight, and in certain cases, about 10% to about 30% by weight.

In the initial stages of the various procedures falling within the scope of this invention, the polymer solution is formed into a liquid layer. The layer will generally be formed over a substrate to define the lateral dimensions of the layer. In certain cases, the substrate is not removed during or after the fabrication process and remains as a component of the final product. In many of these cases, and particularly those in which the nanotube array is to serve as a filtration or reverse osmosis medium, the substrate is a porous substrate, particularly microporous, and often a hydrophilic microporous material. The support can be made of any material that is wettable by the polymer solution, inert to the polymer and all of the solvents and suspending media used in the fabrication process, and one to which the polymer once coagulated will adhere. Examples of materials from which the support can be made are polyesters, polypropylenes, polyethersulfones, polysulfones, and nylons and polyamides in general, all preferably in the form of a non-woven fabric. The porous support can serve a filtering function by size exclusion, although such filtering will be substantially more coarse than that of the membrane-supported nanotubes. In general, the porosity of the support can vary widely, although in most cases a non-woven support with a flow rate of between 0.001 and 100 cubic feet per minute (CFM), preferably 0.005 CFM, will be effective.

When a microporous support is used, its dimensions can vary widely to meet the needs of the particular applications. When the supported membrane is used in purification, filtration, or other fluid treatment, for example, the lateral area will affect the throughput rate, and both the lateral area and the thickness will be chosen with view toward the pressure differential that will be imposed across the combined support and membrane during use. Supports that are capable of withstanding pressure differentials of from about 1 atmosphere to about 85 atmospheres without rupturing will be adequate in most applications. While supports of any size or shape can be used; a typical example would be a flat disk with a diameter range of about 10 mm to about 100 mm. Diameters ranging from 13 mm to 47 mm, specifically disks of 13 mm, 25 mm, and 47 mm, are of particular interest in certain applications. For disks of diameters between 10 mm and 100 mm, the disk thickness preferably ranges from about 0.15 mm to about 0.25 mm. The support with the completed membrane-supported nanotube array can be prepared in the form of a rectangular sheet ranging from 1 inch (2.5 cm) to 40 inches (102 cm) in width and four inches (ten cm) to about 400 feet (122 m) in length, prior to cutting to the size desired for a particular application. Widths of 9.75 inches (24.8 cm), 10 inches (25.4 cm), 20 inches (51 cm), and 40 inches (102 cm) are of particular interest in certain applications. As for the thickness of the support, the support in most cases need only be thick enough to provide structural support for the membrane. A thickness of about 0.15 mm to about 0.25 mm is adequate for many filtration-type applications.

In certain other implementations of the invention, the substrate is removed after the membrane supporting the nanotube array has been solidified. In these cases, the substrate is either replaced with another support or substrate or is not replaced at all, and the polymer-supported nanotube array is used without a substrate.

Regardless of whether the initial substrate is retained, replaced, or removed without replacement, the thickness of the layer of polymer solution that is laid over the surface of the substrate on which the nanotube array is formed will affect the thickness of the solidified polymer that secures the conformation and orientation of the nanotube array. The thickness of the layer of polymer solution can also affect the functionality of the nanotube array for its intended use. In most cases, best results will be obtained by formation of a polymer solution layer that is from about 100 µM to about 200 µm in thickness, and most often from about 150 µm to about 200 µm. A thickness of about 180 µm is illustrative.

Once the layer of liquid polymer solution is formed, the nanotube suspension is applied to the exposed surface of the layer. The liquid that serves as the suspending medium for the nanotubes is one that wets the nanotubes, is at least partially miscible with the solvent of the polymer solution, and is volatile or can be made to evaporate at a controlled rate by control of the atmosphere in which the solution and suspension are placed in contact. The suspending medium is selected such that its miscibility in the solvent and its rate of evaporation are such that at least a portion of the suspending medium migrates into the polymer solution while at least a portion of the suspending medium evaporates. Evaporation of all of the suspending medium may thus occur, but portions of the suspending medium that have yet to evaporate may first migrate into the solvent and evaporate from the solvent. Conversely, a portion of the suspending medium may evaporate directly, leaving the remainder to migrate into the solvent and then to evaporate from the solvent. Control of the evaporation rate and the miscibility of the liquids to achieve these effects can be obtained by the selection of both the solvent and the suspending medium that perform in this manner under a given atmosphere of temperature, pressure, and vapor phase composition, and alternatively by using a mixture of organic liquids of different boiling points.

When a mixture of organic liquids is used as the suspending agent, the evaporation rate can be controlled by selection of liquids of particular boiling points, selection of the difference in the boiling points of the two liquids, or selection of the relative amounts of the two liquids, or all three. The boiling points and the boiling point differential can both vary, depending on the needs of the system and the results sought, and optimal choices are determined by routine experimentation. In most cases, best results will be obtained when both liquids (i.e., the two liquids that form a mixture used as the nanotube suspending medium) have boiling points below 200° C., and one of the liquids has a boiling point that is lower than that of the other by a differential of 50 to 125 degrees (Celsius), or in many cases a differential of 50 to 100 degrees, or a differential of 75 to 100 degrees. Examples of organic liquids that can be used as suspending agents, either singly or in mixtures, are tetrahydrofuran (THF), dimethyl formamide (DMF), dimethyl acetamide (DMAC), dimethyl sulfoxide (DMSO), and N-methylpyrrolidone (NMP). When a mixture of high-boiling and low-boiling organic liquids is used, an example is THF as the low-boiling component and either DMF, DMAC, DMSO, or NMP as the high-boiling component. To further illustrate these mixtures, ranges for the relative amounts of the components can be, for example, 50% to 85% of the low-boiling component and 15% to 50% of the high-boiling component, by weight.

Both liquids of the suspending medium in a two-component medium will be at least partially miscible with the solvent used to form the polymer solution. The expression "at least partially miscible" is intended to include liquids that are miscible in all proportions as well as liquids that miscible only within a range of proportions with a lower limit well above zero, an upper limit well below 100%, or both. When using suspending media (including both single-species suspending media and mixed-species suspending media) that are only partially miscible with the solvent, the amount of suspending medium relative to the amount of solvent can be selected to be within the miscibility limits, thereby achieving full miscibility.

When a single organic liquid is used as the nanotube suspending medium, the migration and evaporation rates of the liquid can be controlled by placing or contacting the wet layers in a closed vessel in which a vapor space is maintained above the layers and in which the temperature and pressure, and particularly the partial pressure of the suspending medium itself, are controlled to achieve a desired evaporation rate. For a low-boiling liquid, the evaporation rate can be adjusted by lowering the temperature below ambient temperature, while for a high-boiling liquid, the evaporation rate control can be adjusted by raising the temperature above ambient. In many cases, effective results will be achieved with a temperature within the range of about 17° C. to about 30° C. A closed vessel can also be used with a two-component suspending medium, and temperature and partial pressure can be controlled here as well to achieve a desired evaporation rate. For example, using a suspending medium that contains both tetrahydrofuran (THF) and dimethylsulfoxide at a weight ratio of 3:1, a favorable evaporation rate can be achieved with a temperature of 20° C. and a THF partial pressure equal to its vapor pressure at 20° C. A favorable evaporation rate in this example will be from about one second to about 30 seconds, and most favorably about three seconds. The evaporation rate can also be selected to achieve about 250 nm, on average, of nanotube length protruding from the surface of the liquid.

The proportion of nanotubes in the nanotube suspension can vary as well, and will be selected on the basis of the properties sought for the fixed nanotube array to be formed. In most cases, effective results will be achieved with about 0.05% to about 3.0% nanotubes by weight in the suspending medium, and in some cases, optimal results will be achieved within a range of about 0.1% to about 0.4%. In some cases as well, the dispersibility of the nanotubes in the suspending medium can be enhanced by the inclusion of a dispersing medium, examples of which are alkylamines such as octadecylamine, dodecylamine, and tetradecylamine. One example of a carbon nanotube suspension in a two-component suspending medium is a mixture of 70% tetrahydrofuran and 30% DMF, with 0.35% octadecylamine and 0.35% carbon nanotubes.

The nanotube suspension can be applied to the layer of polymer solution in a variety of ways. The suspension can be applied as a continuous thin film fully covering the liquid surface of the polymer solution or as droplets discretely distributed over the surface. When a two-component suspending medium is used, the two components can be combined to form the suspension before the suspension is applied to the polymer solution layer, or the two components can be applied in succession with the nanotubes dispersed in one or both of the components prior to the application. When the suspension is applied as droplets, application can be achieved by the use of conventional atomizing equipment. An example of such equipment is an ultrasonic sprayer operating at 20-60 kHz and preferably 20 kHz. The droplet size can vary widely with the choice of sprayer, although in many cases droplets with diameters within the range of about 20 µm to about 250 µm will be preferred. An illustrative spray rate is from about one mL/min to about five mL/min, or generally about three mL/min. The droplets can be applied in two stages, the second stage occurring after an interval of time sufficient to allow the droplets from the first stage to complete most or all of their migration into the polymer solution and simultaneous evaporation. When the suspension is applied as a thin film, the film will often be within the range of about 1 µm to about 20 µm in thickness, and when a two-component suspending medium is used, a film of the low-boiling component can be applied first, followed by a film of the high-boiling component. As a still further variation, the low-boiling component can be applied first as a thin film, followed by the high-boiling component as droplets. As a still further variation, a thin film of either component, or of a single-component suspension, can be applied by a stamping process in which a flat surface is wetted with the component and then inverted over, and placed in contact with, the polymer solution layer to transfer the film from the wetted surface to the liquid layer.

Coagulation of the polymer can be achieved by extracting the solvent, inducing an attraction between the polymer chains, or both. For hydrophobic polymers that are initially dissolved in organic solvents that are immiscible with water, the immersion of the layers and the substrate on which they are formed in water will in many cases cause the desired coagulation. Alternatively, a coagulation agent, examples of which are ethanol, isopropanol, and dimethyl formamide, or combinations thereof, can be added.

Alternatively, the coagulation of the polymer may be achieved by lowering the temperature of the polymer solvent to a temperature at which coagulation occurs. The temperature lowering may be used separately from or together with the water immersion or coagulation agent addition.

As described above, if the nanotubes in the suspension are close ended, then a chemical or thermal oxidation treatment may be used to open the protruding ends of the nanotubes after the coagulation is completed.

The coagulated polymer forms a polymer skin with open-ended nanotubes embedded in the skin and protruding through opposite surfaces of the skin to provide fluid communication through each of the nanotubes through the membrane. The skin forms a completely or substantially impermeable barrier around the nanotubes, such that all fluid permeates through the membrane via the hollow inner cores of the nanotubes rather than through the skin or between the nanotube surface and the polymer skin. As noted above, the skin may comprises polyurethanes, polyphthalamides, polyesters, polysulfonamides, siloxanes, polyamides, and/or polyimides. Cellulose acetate and polyimide are particularly useful in many applications.

Preferably, the polymer is solidified from the liquid layer such that the polymer skin forms on top of a porous polymer support having the same composition as the polymer skin. The nanotubes protrude through the polymer skin into the porous polymer support. Since the nanotubes protrude into the porous polymer support, the fluid, such as water, can permeate from above the skin, through the nanotubes and out of the membrane through the pores of the porous support.

At least one or both of the nanotube suspending medium evaporation and polymer coagulation/solidification processes preferentially orient the nanotubes in the skin. The oriented nanotubes have a preferred orientation relative to the skin but are not aligned with respect to each other.

In one non-limiting embodiment, the nanotubes have a preferred orientation relative to the skin such that at least 50% of the nanotubes, such as at least 70%, for example at least 60-80% of the nanotubes have a lengthwise axis (i.e., the axis along the hollow core of the nanotube) which is within 30 degrees, such as zero to 20 degrees from an imaginary line normal to a major surface of the polymer skin. It should be noted that the nanotubes are not necessarily straight and may have bends, twists, curves and turns. However, the average deviation of the axis is 30 degrees or less from the normal to the skin surface.

In one non-limiting embodiment, the nanotubes are not aligned with respect to each other such that the protruding nanotubes do not form an ordered array of equidistant protrusions in the skin, the protruding nanotubes are spaced apart from each other by random distances, and at least a portion of the nanotube tips which protrude from the skin agglomerate into a nanotube tip bundle. Thus, while the majority of the nanotubes are preferentially oriented roughly perpendicular to the major skin surfaces, the nanotube protrusions are not exactly parallel to each other, protrude through random locations in both skin surfaces and form tip bundles, similar to a tangle of bushes in a dense forest.

The finished nanotube arrays have a wide range of utilities and can be incorporated into other media or combined with other components to serve various functions. The arrays can be used as nanofiltration membranes for water desalination and a variety of other filtration or reverse osmosis applications. Carbon nanotube arrays can also be used as antimicrobial agents by penetrating the lipid bilayer membranes of bacterial cells and thereby rendering the cells incapable of growth or of biofilm formation. A fixed array of nanotubes with orientations transverse to the cell membrane surface facilitates this effect. Field emission devices using carbon nanotubes will also benefit from the arrays of the present invention, since the orientation of the nanotubes transverse to a substrate surface is beneficial in this context as well. Still further, solar cells of various energy conversion technologies utilize carbon nanotubes to mitigate charge carrier losses, since due light absorption and carrier collection occur in directions normal to each other, and properly oriented nanotubes will produce this effect more efficiently than randomly oriented nanotubes. In all devices and applications utilizing nanotubes where a general alignment of the nanotubes produces a functional advantage, the present invention offers significant cost and scaling advantages over such methods such as chemical vapor deposition and the use of shadow masks.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A process for the formation of a membrane-supported nanotube array comprising open-ended nanotubes embedded in, and extending through, a membrane to form conduits from a first side of said membrane to a second side thereof, said process comprising:
    (a) forming a layer of liquid polymer solution comprising a polymer dissolved in a nonaqueous solvent, said layer having an exposed surface;
    (b) applying to said exposed surface a nanotube suspension comprising a liquid suspension of open-ended nanotubes in a liquid suspending medium that is miscible with said nonaqueous solvent;
    (c) incubating said layer of liquid polymer solution with said nanotube suspension on said exposed surface to cause said liquid suspending medium to simultaneously dissolve in said polymer solution and at least partially evaporate; and
    (d) after said liquid suspending medium that has not evaporated in (c) has dissolved in said polymer solution, contacting said layer with an aqueous liquid to solidify said polymer into a nanotube-containing polymer skin with open-ended nanotubes embedded therein and extending therethrough,
    wherein said liquid suspending medium is a mixture of a first organic liquid and a second organic liquid, both said first and second organic liquids being miscible with each other and with said nonaqueous solvent, both said first and second organic liquids having normal boiling points below 200° C., and said first organic liquid having a boiling point lower than the boiling point of said second organic solvent by 50 to 125 degrees, and step (c) comprises incubating said substrate, liquid layer, and suspension to cause said first organic liquid to evaporate while said second organic liquid dissolves in said liquid solution of said polymer.

2. The process of claim 1 wherein step (a) comprises wetting a porous solid substrate with said liquid polymer solution and thereby forming said layer on said porous solid substrate.

3. The process of claim 2 wherein said substrate is defined as a first porous solid hydrophilic substrate, and step (b) comprises contacting said liquid layer with a second substrate whose surface is coated with a liquid film of said nanotube suspension to transfer said liquid film of said nanotube suspension from said second substrate to said liquid layer of said polymer solution.

4. The process of claim 2 wherein said porous solid substrate is a member selected from the group consisting of polyethersulfone, polysulfone, nylon, polyester, cellulose acetate, and polyimide.

5. The process of claim 2 wherein said porous solid substrate is a member elected from the group consisting of cellulose acetate and polyimide.

6. The process of claim 2 further comprising (e) removing said nanotube-containing polymer skin free of solvents from the substrate as said membrane.

7. The process of claim 1 wherein said first organic liquid constitutes from about 50% to about 85% by weight of said first and second organic liquids combined.

8. The process of claim 1 wherein step (b) comprises applying droplets of said nanotube suspension to the surface of said liquid layer.

9. The process of claim 8 wherein said droplets of step (b) are 20 microns to 250 microns in diameter.

10. The process of claim 8 further comprising applying to the surface of said liquid layer a second application of droplets of said liquid suspension after step (c) and before step (d).

11. The process of claim 1 wherein step (b) comprises forming a film of said nanotube suspension of about ten microns to about one hundred microns in thickness to the surface of said liquid layer.

12. The process of claim 1 wherein step (c) is performed in a closed vessel having an internal atmosphere of controlled temperature and pressure, and step (c) comprises maintaining said temperature and pressure at levels that cause said liquid suspension medium to simultaneously dissolve in said polymer solution and evaporate.

13. The process of claim 1 wherein said boiling point of said first organic liquid is lower than the boiling point of said second organic solvent by 50 to 100 degrees.

14. The process of claim 1 wherein said boiling point of said first organic liquid is lower than the boiling point of said second organic solvent by 75 to 100 degrees.

15. The process of claim 1 wherein said first organic liquid is tetrahydrofuran.

16. The process of claim 1 wherein said first organic liquid is tetrahydrofuran and said second organic liquid is a member selected from the group consisting of dimethyl formamide, dimethyl acetamide, dimethyl sulfoxide, and N-methylpyrrolidone.

17. The process of claim 1 wherein said first organic liquid is tetrahydrofuran and said second organic solvent is dimethylformamide.

18. The process of claim 1 wherein said nonaqueous solvent is a mixture of acetone and formamide.

19. The process of claim 1 wherein said nanotubes are carbon nanotubes, and the ratio of the average length of said nanotubes to the thickness of said skin is from about 1.3 to about 5.

20. The process of claim 1 wherein said nanotubes are carbon nanotubes having an average length of from about 100 nm to about 2000 nm.

21. The process of claim 1 wherein said nanotubes are carbon nanotubes having an average length of from about 200 nm to about 1000 nm.

22. The process of claim 1 wherein said nanotubes are carbon nanotubes with inner diameters of 0.4 nm to 200 nm.

23. The process of claim 1 wherein said nanotubes are single-wall carbon nanotubes with inner diameters of 0.4 nm to 1.2 nm.

24. The process of claim 1 wherein said nanotubes constitute from about 0.1% to about 0.6% by weight of said nanotube suspension.

25. The process of claim 1 wherein said polymer constitutes from about 5% to about 50% by weight of said liquid polymer solution.

26. The process of claim 1 wherein said polymer constitutes from about 10% to about 30% by weight of said liquid polymer solution.

27. The process of claim 1 wherein step (b) is performed in a closed vessel with a vapor space above said substrate, at a temperature of from about 17° C. to about 30° C., and at approximately atmospheric pressure.

28. A process for formation of a filter membrane, which membrane comprises a polymer skin with open-ended nanotubes embedded in the skin and protruding through opposite surfaces of the skin to provide fluid communication through each of the nanotubes through the membrane, and the skin forming a substantially impermeable barrier around the nanotubes, the process comprising:

(a) forming a layer of liquid polymer solution comprising a polymer dissolved in a solvent, the layer having an exposed surface;

(b) applying to the exposed surface a nanotube suspension comprising a liquid suspension of nanotubes in a liquid suspending medium that is at least partially miscible with the solvent;

(c) incubating the layer of liquid polymer solution with the nanotube suspension on the exposed surface to cause the liquid suspending medium to at least partially dissolve in the polymer solution and at least partially evaporate the liquid suspending medium; and (d) solidifying the polymer into the polymer skin with the nanotubes embedded therein and protruding therethrough, wherein step (b) comprises applying droplets of said nanotube suspension to the surface of said liquid layer, forming a film of said nanotube suspension of about ten microns to about one hundred microns in thickness to the surface of said liquid layer, or transferring the film of nanotube suspension from a stamp to the liquid layer.

29. The process of claim 28 wherein:

the solvent comprises a non-aqueous solvent;

the suspending medium is miscible with the solvent; and in step (c), the dissolving and evaporating occur simultaneously.

30. The process of claim 29 wherein step (a) comprises wetting a porous solid substrate with said liquid polymer solution and thereby forming said layer on said porous solid substrate.

31. The process of claim 30 wherein said liquid suspending medium is a mixture of a first organic liquid and a second organic liquid, both said first and second organic liquids being miscible with each other and with said nonaqueous solvent, both said first and second organic liquids having normal boiling points below 200° C., and said first organic liquid having a boiling point lower than the boiling point of said second organic solvent by 50 to 125 degrees, and step (c) comprises incubating said substrate, liquid layer, and suspension to cause said first organic liquid to evaporate while said second organic liquid dissolves in said liquid solution of said polymer.

32. The process of claim 31 wherein said first organic liquid is tetrahydrofuran and said second organic liquid is a member selected from the group consisting of dimethyl formamide, dimethyl acetamide, dimethyl sulfoxide, and N-methylpyrrolidone.

33. The process of claim 29 wherein step (b) comprises applying droplets of said nanotube suspension to the surface of said liquid layer.

34. The process of claim 29 wherein step (c) is performed in a closed vessel having an internal atmosphere of controlled temperature and pressure, and step (c) comprises maintaining said temperature and pressure at levels that cause said liquid suspension medium to simultaneously dissolve in said polymer solution and evaporate.

35. The process of claim 29 wherein said nonaqueous solvent is a mixture of acetone and formamide.

36. The process of claim 28 wherein the nanotube suspension comprises nanotubes which are open ended on both ends.

37. The process of claim 28 wherein the nanotube suspension comprises nanotubes which are close ended on one or both ends, and further comprising opening one or both of the closed ends of the nanotubes protruding through the skin after step (d).

38. The process of claim 28 wherein solidifying the polymer comprises contacting the layer of liquid polymer solution with an aqueous liquid.

39. The process of claim 28 wherein solidifying the polymer comprises at least one of lowering a temperature of the solution or adding a coagulation agent to the solution.

40. The process of claim 28 wherein solidifying the polymer into the polymer skin with the nanotubes embedded therein and protruding therethrough comprises forming the polymer skin on a porous polymer support having the same composition as the polymer skin such that the nanotubes protrude through the polymer skin into the porous polymer support.

41. The process of claim 28 wherein said nanotubes are carbon nanotubes, and the ratio of the average length of said nanotubes to the thickness of said skin is from about 1.3 to about 5.

42. The process of claim 28 wherein at least one of the evaporating the liquid suspending medium or the solidifying the polymer into the polymer skin comprises orienting the nanotubes such that the nanotubes have a preferred orientation relative to the skin but are not aligned with respect to each other.

43. A filter membrane, comprising:
a polymer skin;
a porous polymer support supporting the polymer skin, wherein the support has the same composition as the polymer skin; and
open-ended nanotubes embedded in the skin and protruding through opposite surfaces of the skin to provide fluid communication through each of the nanotubes through the membrane;

wherein:

the skin forms a substantially impermeable barrier around the nanotubes;

the nanotubes have a preferred orientation relative to the skin but are not aligned with respect to each other; and the nanotubes are not aligned with respect to each other such that the protruding nanotubes do not form an ordered array of equidistant protrusions in the skin, the protruding nanotubes are spaced apart from each other by random distances, and at least a portion of the nanotube tips which protrude from the skin agglomerate into a nanotube tip bundle.

44. The membrane of claim 43 wherein the nanotubes comprise carbon nanotubes which protrude through the polymer skin into the porous polymer support.

45. The membrane of claim 43 wherein:

the nanotubes have the preferred orientation relative to the skin such that at least 50% of the nanotubes have a lengthwise axis which is within 30 degrees from an imaginary line normal to a major surface of the polymer skin.

* * * * *